(12) United States Patent
Lindner et al.

(10) Patent No.: US 6,532,767 B1
(45) Date of Patent: Mar. 18, 2003

(54) METHODS FOR PRODUCING FUSED SILICA GLASS

(75) Inventors: Raymond E. Lindner, Corning, NY (US); Mahendra Kumar Misra, Horseheads, NY (US); David C. Sauer, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/659,880

(22) Filed: Sep. 12, 2000

Related U.S. Application Data

(63) Continuation of application No. 09/399,282, filed on Sep. 17, 1999, now abandoned.
(60) Provisional application No. 60/101,271, filed on Sep. 22, 1998.

(51) Int. Cl.[7] ................................. C03B 19/06
(52) U.S. Cl. .............. 65/17.4; 65/17.5; 65/29.13; 65/29.15; 65/413; 65/37; 65/134.7; 65/134.6; 65/424; 65/426; 65/427; 65/379; 65/384; 65/DIG. 8; 65/DIG. 13
(58) Field of Search ................ 65/17.4, 29.13, 65/29.15, 17.5, 413, 377, 134.6, 134.7, 424, 426, 427, 379, 384, DIG. 8, DIG. 13

(56) References Cited

U.S. PATENT DOCUMENTS

| 5,086,352 A | 2/1992 | Yamagata et al. |
| 5,719,698 A | 2/1998 | Hiraiwa et al. |

FOREIGN PATENT DOCUMENTS

| EP | 136708 | * 4/1985 | ............ 65/424 |
| JP | 59-24743 B2 | * 6/1984 | ............ 65/424 |
| JP | 59-227734 | * 12/1984 | ............ 65/17.4 |
| JP | 60-090853 | 5/1985 | |
| WO | WO 97/10182 | 3/1997 | |

* cited by examiner

Primary Examiner—Michael Colaianni
(74) Attorney, Agent, or Firm—Edward Murphy; Timothy M. Schaeberle; Maurice M. Klee

(57) ABSTRACT

Methods for producing high purity fused silica (HPFS) glass having desired levels of dissolved hydrogen are provided. The methods involve measuring the level of hydrogen in the cavity of the furnace used to produce the glass and controlling the pressure within the furnace and/or gas flows to the furnace's burners so that the measured concentration has a desired value. In this way, the level of dissolved hydrogen in the glass can be controlled since, as shown in FIG. 3, there is a direct correlation between the hydrogen concentration in the cavity atmosphere and level of dissolved hydrogen in the glass.

22 Claims, 3 Drawing Sheets

METHODS FOR PRODUCING FUSED SILICA GLASS

CROSS REFERENCE TO RELATED APPLICATIONS

This is a continuation application of U.S. application Ser. No. 09/399,282, filed on Sep. 17, 1999, which claims the benefit under 35 USC §119(e) of U.S. Provisional Application No. 60/101,271, filed Sep. 22, 1998, the contents of both of which in their entireties are hereby incorporated by reference.

FIELD OF THE INVENTION

This invention relates to methods for producing fused silica glass and, in particular, to methods for obtaining desired levels of dissolved hydrogen in high purity fused silica (HPFS) glass.

BACKGROUND OF THE INVENTION

Dissolved molecular hydrogen in HPFS glass is required to provide the glass with resistance to structural damage when exposed to laser pulses. One method for producing HPFS glass, which is in commercial use by the assignee of this invention, involves introducing an organic feedstock containing silicon along with natural gas and oxygen to burners located in the crown of a high temperature refractory furnace. The burners produce fine silica particles (soot particles) which are collected to form a glass boule. Preferred raw materials are natural gas as the fuel and octamethylcyclotetrasiloxane (OMCTS) as the silicon source, both of which are burned in the presence of oxygen to produce the soot particles.

The combustion of the feedstock and the fuel also produces hydrogen either as an intermediate combustion product or from the dissociation of water molecules. Thus, in the burner flame, an atmosphere containing hydrogen surrounds the silica particles. Since the flame temperatures are high and hydrogen is soluble in silica, there is always an equilibrium between dissolved hydrogen in silica and the amount of hydrogen in the atmosphere surrounding the silica particles.

FIG. 1 is a schematic diagram of a furnace that can be used to produce silica-containing bodies (boules) in accordance with the above technique. As shown therein, furnace 10 includes crown 11 and side walls 12 which together form furnace cavity 13. Located within the cavity is cup 14, which has a bottom surface 15 and side walls 16 for, respectively, supporting and retaining the growing boule. Bottom surface 15 is typically covered with a sand bait at the beginning of the soot deposition process. The furnace can also include internal wall 17 which moves with cup 14 and controls air flow around the boule as it is deposited. See commonly-assigned PCT Patent Publication No. WO97/10182, the contents of which are incorporated herein by reference.

As indicated by arrows 18 and 19 in FIG. 1, the design of the furnace is such that room air is infiltrated into the furnace cavity 13 either through the burner holes 20 formed in the crown or though the gap between cup 14 and internal wall 17. The infiltrated air reduces the concentration of hydrogen in the furnace atmosphere in two ways. First, it physically dilutes the combustion gases, and second, it brings in additional oxygen that reacts with the hydrogen to form water vapor. The overall result of the entrained air is a reduction in dissolved hydrogen in the glass boule.

As practiced in the past, the above process has suffered from the problem of lack of control of the air that is infiltrated into the furnace cavity. While the flow of OMCTS, natural gas, and oxygen through the burners has been carefully regulated, there has been no control of the air infiltrating into the process. Such factors as cavity pressure or crown curvature that can influence the level of infiltrated air have not been monitored or controlled.

In accordance with the invention, it has been determined that this lack of control over infiltrated air has resulted in a process that is different between furnaces and different from run-to-run on the same furnace. The boules coming out of these furnaces not only have low dissolved hydrogen, but also have uncontrolled, variable amounts of dissolved hydrogen. Moreover, the problem is not detected until glass samples from the boules are core-drilled and analyzed for dissolved hydrogen. This core-drilling and analyzing process typically takes from days to weeks. If the boules do not meet the required lower limit on hydrogen, then parts made from the boules generally cannot be used in pulsed laser applications.

U.S. Pat. No. 5,719,698, assigned to Nikon Corporation, discloses a procedure for increasing the hydrogen content of silica glasses by supplying hydrogen to the burner used to produce the glass. In particular, the patent describes supplying hydrogen to the inner tubes of a burner and using hydrogen as a carrier gas for $SiCl_4$ or $SiHCl_3$. The patent contains no disclosure or suggestion that the dissolved hydrogen content of a glass boule can be controlled by monitoring the hydrogen concentration in a furnace cavity and then controlling the pressure within the cavity and/or flows to the furnace's burners (e.g., flows of oxygen and/or natural gas) based on the thus monitored hydrogen concentration.

SUMMARY OF THE INVENTION

In view of the foregoing, it is an object of the present invention to provide improved methods for producing silica-containing bodies. More particularly, it is an object of the invention to provide improved methods for producing silica-containing bodies having desired levels of dissolved hydrogen. Preferably, the silica-containing body is high purity fused silica.

To achieve these and other objects, the invention provides a method for forming a silica-containing body comprising:
(a) providing a furnace (10) which comprises:
  (i) a cavity (13);
  (ii) at least one burner (21) which produces soot particles; and
  (iii) a surface (15) within the cavity (13) for collecting the soot particles to form the body;
(b) collecting the soot particles to form the body;
(c) monitoring the hydrogen content within the cavity (13); and
(d) controlling the hydrogen content within the cavity (13) based on the monitoring of step (c).

In certain embodiments, the pressure within the cavity is controlled to achieve a predetermined hydrogen content in the cavity which correlates with a desired dissolved hydrogen content in the silica-containing body. In other embodiments, burner flows, either alone or in combination with cavity pressure, are used for this purpose.

Preferably, the hydrogen content in the cavity is monitored using a high temperature probe (22), a trap (23) for soot particles, and a gas chromatograph (24).

A particularly important advantage of the invention is that the required amount of dissolved hydrogen in the glass is achieved by adjusting the hydrogen in the furnace atmosphere right at the start of the glass-boule forming process. In this way, rejection of large quantities of glass for low levels of dissolved hydrogen is avoided.

Figure 1:
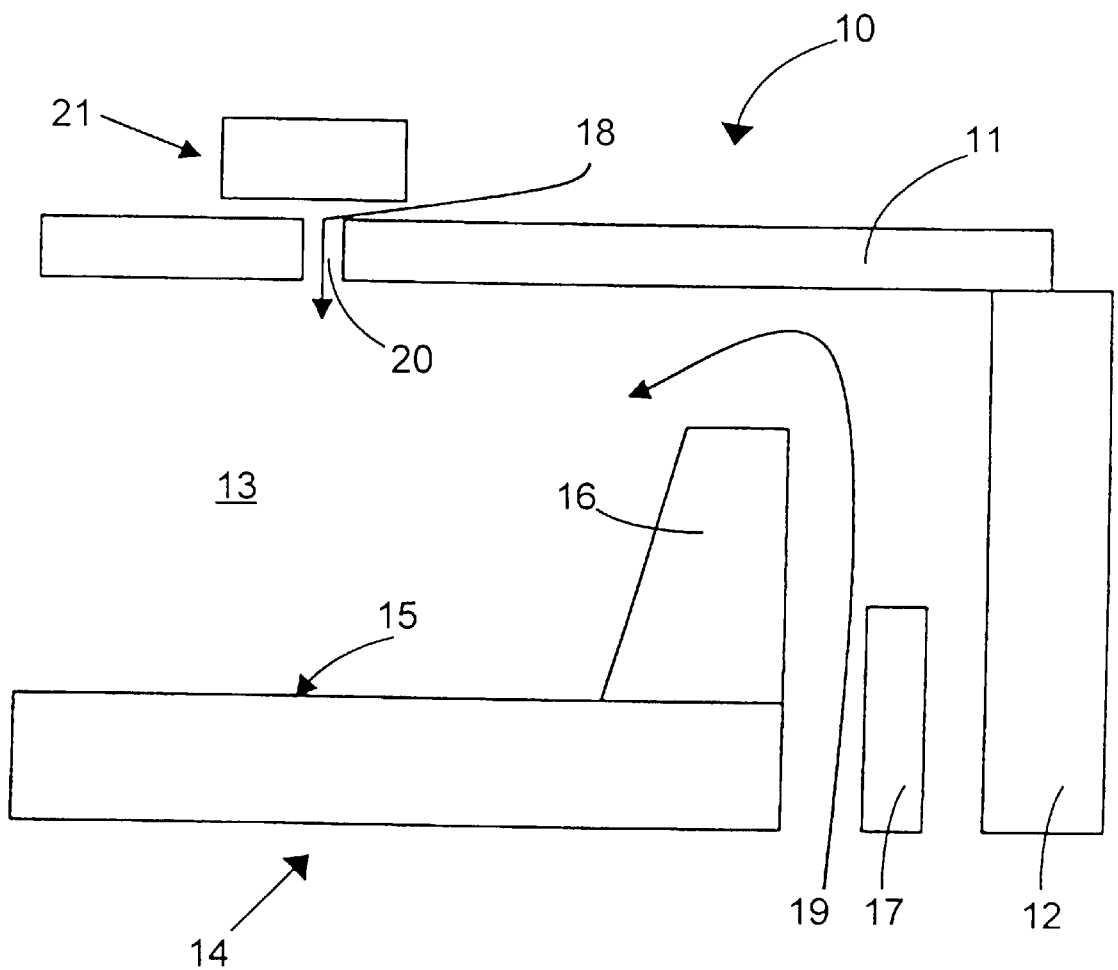
FIG. 1 is a schematic diagram of a furnace with which the present invention can be used.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention. The drawings are not intended to indicate scale or relative proportions of the elements shown therein.

The reference numbers used in the drawings correspond to the following:

10 furnace
11 furnace crown
12 furnace side walls
13 furnace cavity
14 cup
15 bottom surface of cup
16 side walls of cup
17 internal wall of furnace
18 infiltrated air
19 infiltrated air
20 burner hole in crown
21 burner
22 high temperature probe
23 trap
24 gas chromatograph
25 vacuum pump

DETAILED DESCRIPTION OF THE INVENTION

As discussed above, the present invention relates to methods for achieving desired levels of dissolved hydrogen in fused silica glasses through adjustments in the atmosphere within a furnace used to produce the glass. In particular, fused silica glasses having desired levels of dissolved hydrogen are produced by monitoring the hydrogen concentration within the cavity of a glass making furnace and then adjusting the pressure in the cavity and/or flows to the furnace's burners (e.g., flows of oxygen and/or natural gas) based on the thus monitored hydrogen concentration.

Figure 2:
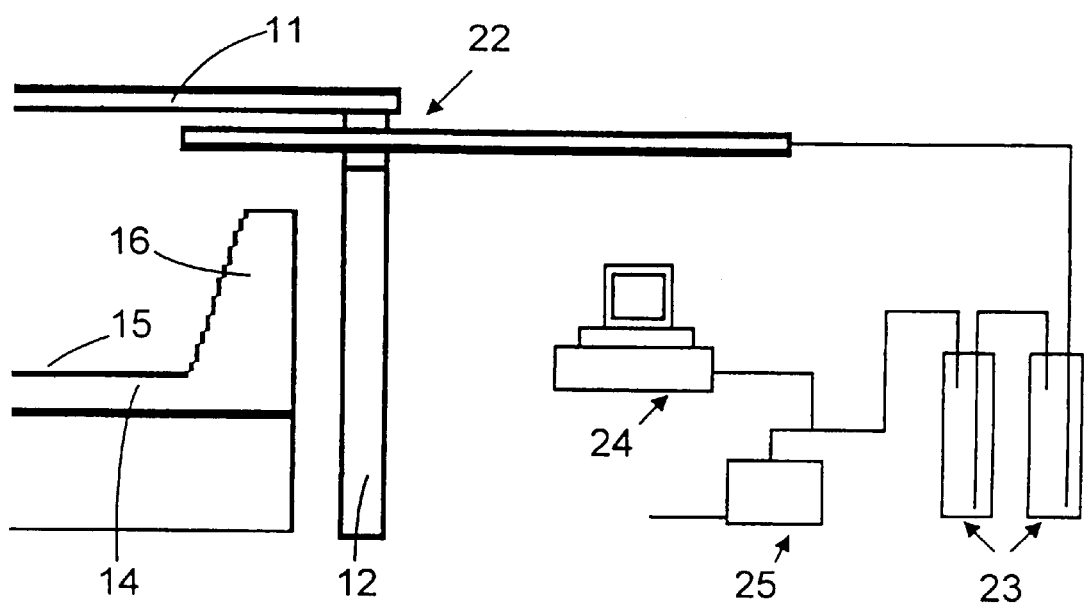
FIG. 2 is a schematic drawing of equipment that can be used in the practice of the methods of the invention. Although not shown in FIG. 2, furnace 10 can include internal wall 17 shown in FIG. 1.

The hydrogen content in the cavity is preferably measured by extracting samples of the furnace atmosphere on a continuous basis and analyzing the composition of the samples. The sampling train, as shown in FIG. 2, consists of a vacuum pump 25 that pulls furnace gases through a high temperature probe 22. The gas sample is passed through trap 23 to remove silica particles and condense out most of the water vapor. The sample is then passed through a drying column (not shown) to remove remaining water vapor and introduced into an online gas chromatograph 24 that does the analysis.

Using this equipment, experiments were performed in which the hydrogen content in the furnace was measured and used to quantify the amount of air that is infiltrated into the furnace cavity. Since the amount of hydrogen in the furnace atmosphere depends on the infiltrated air, by measuring the furnace atmosphere composition and by controlling the furnace cavity pressures, it was found that the hydrogen concentration in the furnace atmosphere could be controlled. Alternatively, by adjusting burner flows, the hydrogen concentration in the cavity can also be controlled.

Figure 3:
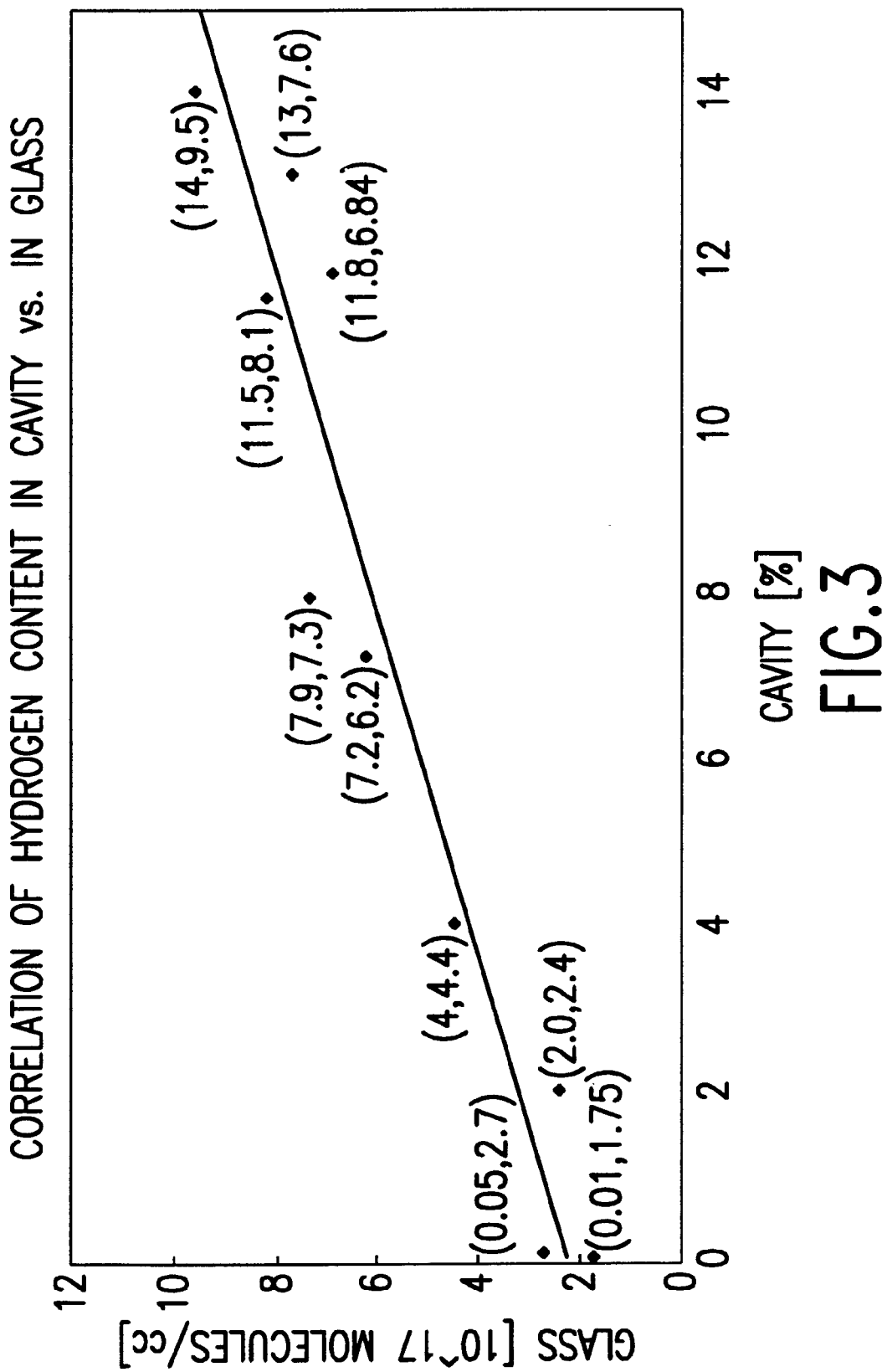
FIG. 3 is a plot of experimental data illustrating the discovery of a substantially linear correlation between the concentration of hydrogen in a furnace's cavity and the concentration of dissolved hydrogen in fused silica glass produced in the furnace.

This ability to control hydrogen concentration in the furnace atmosphere was used to generate the data shown in FIG. 3, where dissolved hydrogen content in the glass boule is plotted against hydrogen content in the furnace cavity. As shown in the figure, in accordance with the invention, it was discovered that there is a strong correlation between the hydrogen dissolved in the glass and the amount of measured hydrogen in the furnace cavity.

By means of a correlation of the type shown in FIG. 3, the concentrations of hydrogen in the furnace atmosphere can be adjusted right at the beginning of the boule-forming process so as to correspond to the required amount of dissolved hydrogen in the glass. In practice, it has been found that by doing so, boules are produced which have the amount of dissolved hydrogen anticipated at the beginning of the run.

As a result of these discoveries, it is now possible to obtain the required amount of dissolved hydrogen in glass by adjusting the hydrogen concentrations in the furnace atmosphere. In this way, the number of boules of HPFS glass rejected because of low levels of dissolved hydrogen can be drastically reduced, thus reducing the cost of producing this glass and providing users of the glass with an improved product.

Although preferred and other embodiments of the invention have been described herein, further embodiments may be perceived by those skilled in the art without departing from the scope of the invention as defined by the following claims.

What is claimed is:

1. A method for forming a silica-containing body comprising:
   (a) providing a furnace which comprises:
      (i) a cavity;
      (ii) at least one burner which produces soot particles; and
      (iii) a surface within the cavity for collecting the soot particles to form the body;
   (b) collecting the soot particles to form the body;
   (c) monitoring the hydrogen content within the cavity; and
   (d) controlling the hydrogen content within the cavity based on the monitoring of step (c).

2. The method of claim 1 wherein the hydrogen content within the cavity is controlled by controlling the pressure within the cavity.

3. The method of claim 2 wherein the pressure is controlled to achieve a predetermined hydrogen content in the cavity which correlates with a desired dissolved hydrogen content in the silica-containing body.

4. The method of claim 3 wherein the predetermined hydrogen content in the cavity is substantially linearly correlated with the dissolved hydrogen content in the silica-containing body.

5. The method of claim 1 wherein the hydrogen content within the cavity is controlled by controlling a gas flow to the at least one burner.

6. The method of claim 5 wherein the gas whose flow is controlled is oxygen.

7. The method of claim 5 wherein the gas whose flow is controlled is natural gas.

8. The method of claim 5 wherein the gas flow is controlled to achieve a predetermined hydrogen content in the cavity which correlates with a desired dissolved hydrogen content in the silica-containing body.

9. The method of claim 8 wherein the predetermined hydrogen content in the cavity is substantially linearly correlated with the dissolved hydrogen content in the silica-containing body.

10. The method of claim 1 wherein the hydrogen content in the cavity is monitored using a high temperature probe, a trap for soot particles, and a gas chromatograph.

11. The method of claim 1 wherein the silica-containing body is high purity fused silica.

12. A method for producing a silica-containing body comprising providing a cavity, controlling the hydrogen content within the cavity, and producing the body in the cavity wherein producing the body in the cavity comprises collecting soot particles within the cavity to form the body.

13. The method of claim 12 wherein control of the hydrogen content within the cavity begins right at the start of the body producing step.

14. The method of claim 12 wherein the hydrogen content within the cavity is controlled by controlling the pressure within the cavity.

15. The method of claim 12 wherein the silica-containing body is high purity fused silica.

16. A method for producing a silica-containing body comprising providing a cavity, controlling the hydrogen content within the cavity, and producing the body in the cavity wherein the hydrogen content within the cavity is controlled by controlling the pressure within the cavity and the pressure is controlled to achieve a predetermined hydrogen content in the cavity which correlates with a desired dissolved hydrogen content in the silica-containing body.

17. A method for producing a silica-containing body comprising providing a cavity, controlling the hydrogen content within the cavity, and producing the body in the cavity wherein the hydrogen content within the cavity is controlled by controlling a gas flow to at least one burner.

18. The method of claim 17 wherein the gas whose flow is controlled is oxygen.

19. The method of claim 17 wherein the gas whose flow is controlled is natural gas.

20. The method of claim 17 wherein the gas flow is controlled to achieve a predetermined hydrogen content in the cavity which correlates with a desired dissolved hydrogen content in the silica-containing body.

21. The method of claim 20 wherein the predetermined hydrogen content in the cavity is substantially linearly correlated with the dissolved hydrogen content in the silica-containing body.

22. A method for producing a silica-containing body comprising providing a cavity, controlling the hydrogen content within the cavity, and producing the body in the cavity wherein:

(i) the hydrogen content within the cavity is controlled by controlling the pressure within the cavity;

(ii) the pressure is controlled to achieve a predetermined hydrogen content in the cavity which correlates with a desired dissolved hydrogen content in the silica-containing body; and (iii) the predetermined hydrogen content in the cavity is substantially linearly correlated with the dissolved hydrogen content in the silica-containing body.

* * * * *